United States Patent
Tamura et al.

(10) Patent No.: US 6,946,618 B2
(45) Date of Patent: Sep. 20, 2005

(54) UNDERWATER LASER PROCESSING APPARATUS AND UNDERWATER LASER PROCESSING METHOD

(75) Inventors: Masataka Tamura, Kanagawa-ken (JP); Seiichiro Kimura, Tokyo (JP); Yuuichi Motora, Tokyo (JP); Hidenori Takahashi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/965,122

(22) Filed: Sep. 28, 2001

(65) Prior Publication Data

US 2002/0036190 A1 Mar. 28, 2002

(30) Foreign Application Priority Data

Sep. 28, 2000 (JP) ........................................ 2000-295818

(51) Int. Cl.⁷ .............................................. B23K 26/00
(52) U.S. Cl. .................................................. 219/121.63
(58) Field of Search ....................... 219/121.81, 121.63, 219/121.64, 121.86

(56) References Cited

U.S. PATENT DOCUMENTS

| 3,632,955 | A | * | 1/1972 | Cruickshank et al. .... 219/85.12 |
| 5,685,999 | A | * | 11/1997 | Wiedemann et al. .. 219/121.78 |
| 5,790,620 | A | * | 8/1998 | Okazaki et al. ................. 134/1 |
| 5,938,954 | A | * | 8/1999 | Onuma et al. ............ 219/121.6 |
| 5,977,515 | A | * | 11/1999 | Uraki et al. ............. 219/121.6 |
| 6,060,686 | A | * | 5/2000 | Jones ..................... 219/121.63 |
| 6,084,202 | A | * | 7/2000 | Okazaki et al. ......... 219/121.61 |

FOREIGN PATENT DOCUMENTS

| JP | 9-10977 | 1/1997 |
| JP | 09010981 A | 1/1997 |
| JP | 10-180476 | 7/1998 |
| JP | 200153382 A | 6/2000 |

* cited by examiner

Primary Examiner—Jonathan Johnson
(74) Attorney, Agent, or Firm—Foley & Lardner LLP

(57) ABSTRACT

An underwater laser processing apparatus includes an optical unit and a nozzle. The optical unit irradiates a condensed laser beam generated by a YAG laser oscillator to a certain point on a underwater workpiece. The nozzle has a gas exit for supplying a gas to the certain point. In the nozzle, an area surrounding the gas exit extends to the surface of the workpiece. This area keeps the supplied gas between the nozzle and the workpiece to improve the underwater laser process.

1 Claim, 6 Drawing Sheets

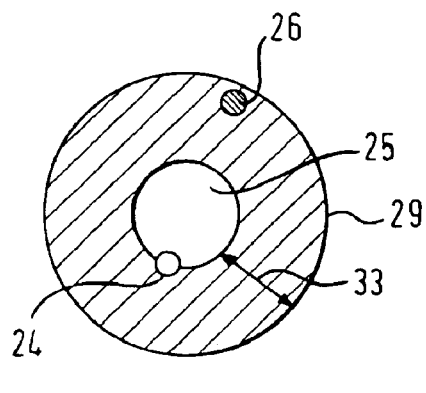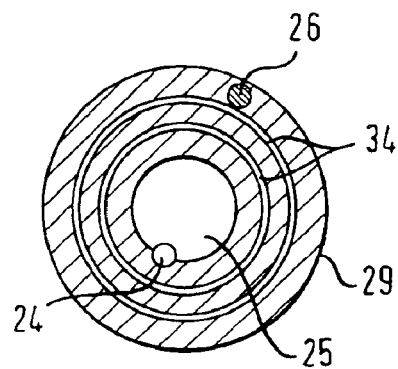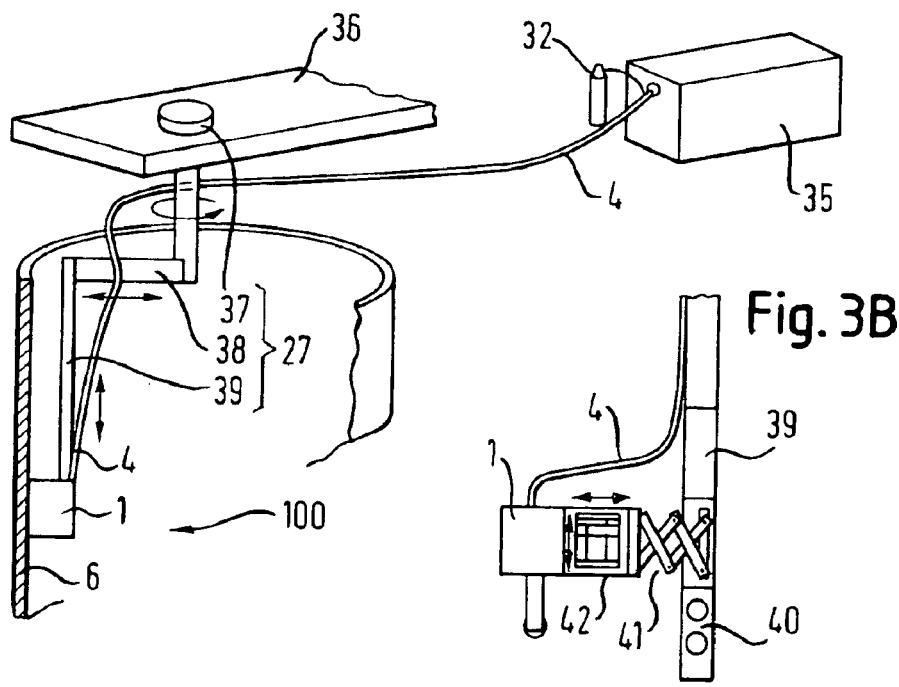

| LASER OSCILLATOR | WAVELENGTH | OUTPUT POWER | PROCESS SPEED | WELDING WIRE | WIRE FEEDING SPEED |
|---|---|---|---|---|---|
| YAG LASER | 1.06 μm | 0.5 ~ 4.0 kW | 0.1 ~ 5 m/min | ⌀ 0.4 ~ 1.0 mm | 0.5 ~ 8 m/min |

S101 — REMOVE SLUG

S102 — REMOVE OXIDATION FILM

S103 — REPAIR / WELD USING LASER BEAM

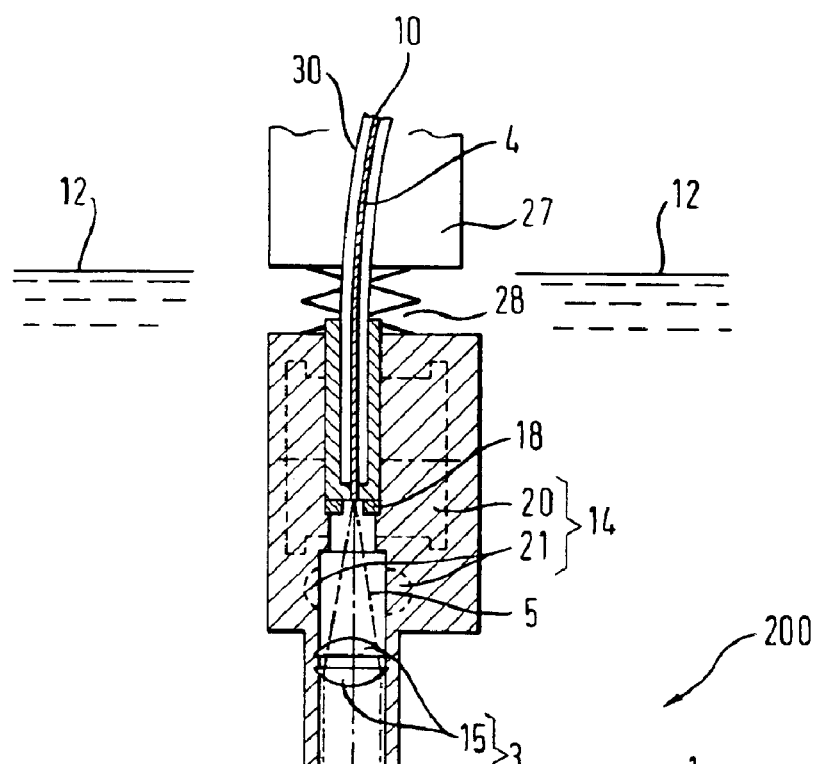
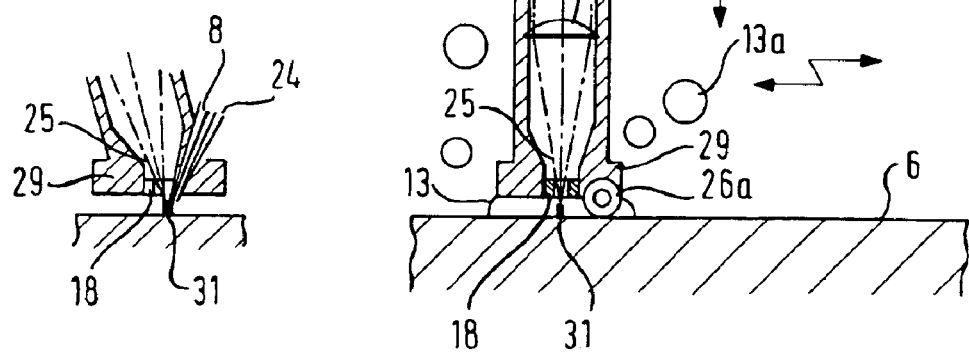
Fig. 7A
Fig. 7B

UNDERWATER LASER PROCESSING APPARATUS AND UNDERWATER LASER PROCESSING METHOD

BACKGROUND OF THE INVENTION

1. Field of the Invention

The present invention relates to an underwater laser processing apparatus and an underwater laser processing method, and more particularly, to an apparatus and a method capable of repairing or welding cracks in a structure underwater using a laser beam for maintaining stability and safety thereof.

2. Description of the Related Art

Conventionally, cracks in a structure such as a nuclear reactor is processed by renewing the whole cracked part or reinforcing the part by fittings and the like. Using a yttrium aluminum garnet (YAG) laser has been recently researched to repair the part directly, which can be processed without discharging water from the nuclear reactor.

Such cracks must be repaired immediately, such as to remove the cracks completely by using a grinder and the like and then weld fillers on the cracks. In order to restrain the growth of cracks, it is important to isolate the cracks from the atmosphere. Sealing up the crack openings with fillers is one effective method.

Some conventional methods for repairing cracks by using a laser beam underwater are disclosed by Japanese patent disclosures PH9-10977 and PH10-180476. FIG. 1 is a sectional view showing an exemplary laser repairing apparatus.

In an optical head 1, an optical unit 3 having lenses 2 is secured. A laser beam 5 guided to the optical head 1 by an optical fiber 4 is condensed by the optical unit 3, and is irradiated from the top of the optical head 1 to the part to be welded in a work or workpiece 6 such as a pipe.

The top of the optical head 1 is formed as a thin nozzle 7 capable of approaching close to a laser spot. A welding wire 8 is provided to the laser spot by a wire feeding path 9, and shield gas 10 is supplied by a gas source (not shown) to the nozzle 7 by a gas feeding path 11.

The laser beam 5 oscillated by a YAG laser is guided to the optical head 1 disposed under water 12 via the optical fiber 4, and the laser beam 5 condensed by the optical unit 3 is irradiated to the workpiece 6. During the process, the welding wire 8 is supplied to the laser spot via the wire feeding path 9.

Meanwhile, the shield gas 10 is supplied to the nozzle 7, via the gas feeding path 11, and is injected from the top of the nozzle 7 to the laser spot. In this process, water is excluded from the point to be welded by the injected shield gas 10 and the gas atmosphere 13 allows the welding process to be generated. Note that the shield gas 10 can keep the dried condition of the welding wire 8.

However, to maintain the welding process the shield gas 10 has to be supplied continuously and water has to be excluded to form the gas atmosphere 13. Here, the optical head 1 is tapered at the top, and if a certain volume of bubbles 13a are created, the same amount of water around the nozzle 7 enters the optical head 1 easily. Thereby, it is difficult to maintain the gas atmosphere 13. When the optical head 1 is in a horizontal position, maintaining the gas atmosphere 13 is much more difficult and the above problem may be exacerbated.

SUMMARY OF THE INVENTION

In one aspect, the present invention addresses of the above-mentioned circumstances and is intended to solve the above-mentioned problems. In particular, the purpose of the present invention is to provide an underwater laser processing apparatus and an underwater laser processing method capable of generating a stable gas atmosphere around a work or workpiece being processed, and thereby realize an underwater laser process of better quality.

Additional purposes and advantages of the invention will be apparent to persons skilled in this field from the following description, or may be learned by practice of the invention.

The present invention provides an underwater laser processing apparatus, including: an optical unit that irradiates a condensed laser beam generated by a laser oscillator to a certain point of an underwater workpiece; and a nozzle having a gas exit for supplying a gas to the certain point, wherein the nozzle has an area surrounding the gas exit extending to the surface of the workpiece for keeping the supplied gas between the nozzle and the workpiece.

The present invention further provides an underwater laser processing method, including: irradiating a condensed laser beam generated by a laser oscillator to a certain point of an underwater workpiece; and supplying a gas to the certain point from a nozzle, having a gas exit and an area surrounding the gas exit, and extending to the surface of the workpiece for keeping the supplied gas between the nozzle, and the work.

The present invention also provides an underwater laser processing apparatus, including: means for irradiating a condensed laser beam generated by a laser oscillator to a certain point of an underwater workpiece; and a supplying means for supplying gas to the certain point, wherein the supplying means has an area surrounding the gas exit and extending to the surface of the workpiece for keeping the supplied gas between the nozzle and the workpiece.

BRIEF DESCRIPTION OF DRAWINGS

The accompanying drawings, which are incorporated in and constitute a part of this specification, illustrate several preferred embodiments of the invention and, together with the description, serve to explain the principles of the invention.

FIG. 3A is a schematic diagram showing the structure above the irradiation head and FIG. 3B is a side view showing a mechanism supporting the irradiation head according to the first embodiment of the present invention.

FIGS. 4A and 4B are sectional views showing nozzles of the present invention.

FIG. 7A is a sectional view showing an irradiation head and FIG. 7B is a sectional view showing the tip portion of the irradiation head according to a second embodiment of the present invention.

DETAILED DESCRIPTION OF THE INVENTION

An underwater laser processing apparatus and an underwater laser processing method of the present invention will now be specifically described in more detail with reference to the accompanying drawings. Wherever possible, the same reference numbers will be used throughout the drawings to refer to the same or like parts.

Figure 1:
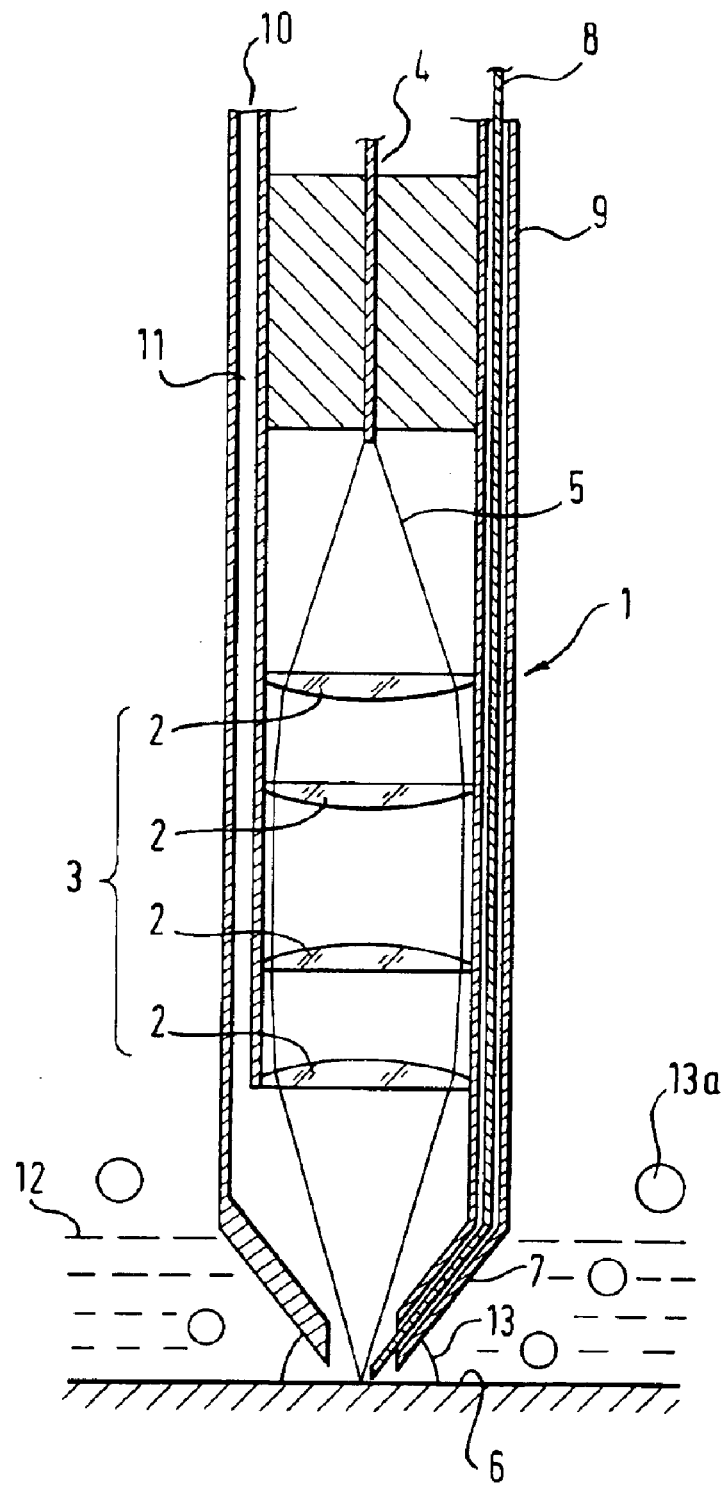
FIG. 1 is a sectional view showing an irradiation head of a conventional underwater laser processing apparatus.
Figure 2A:
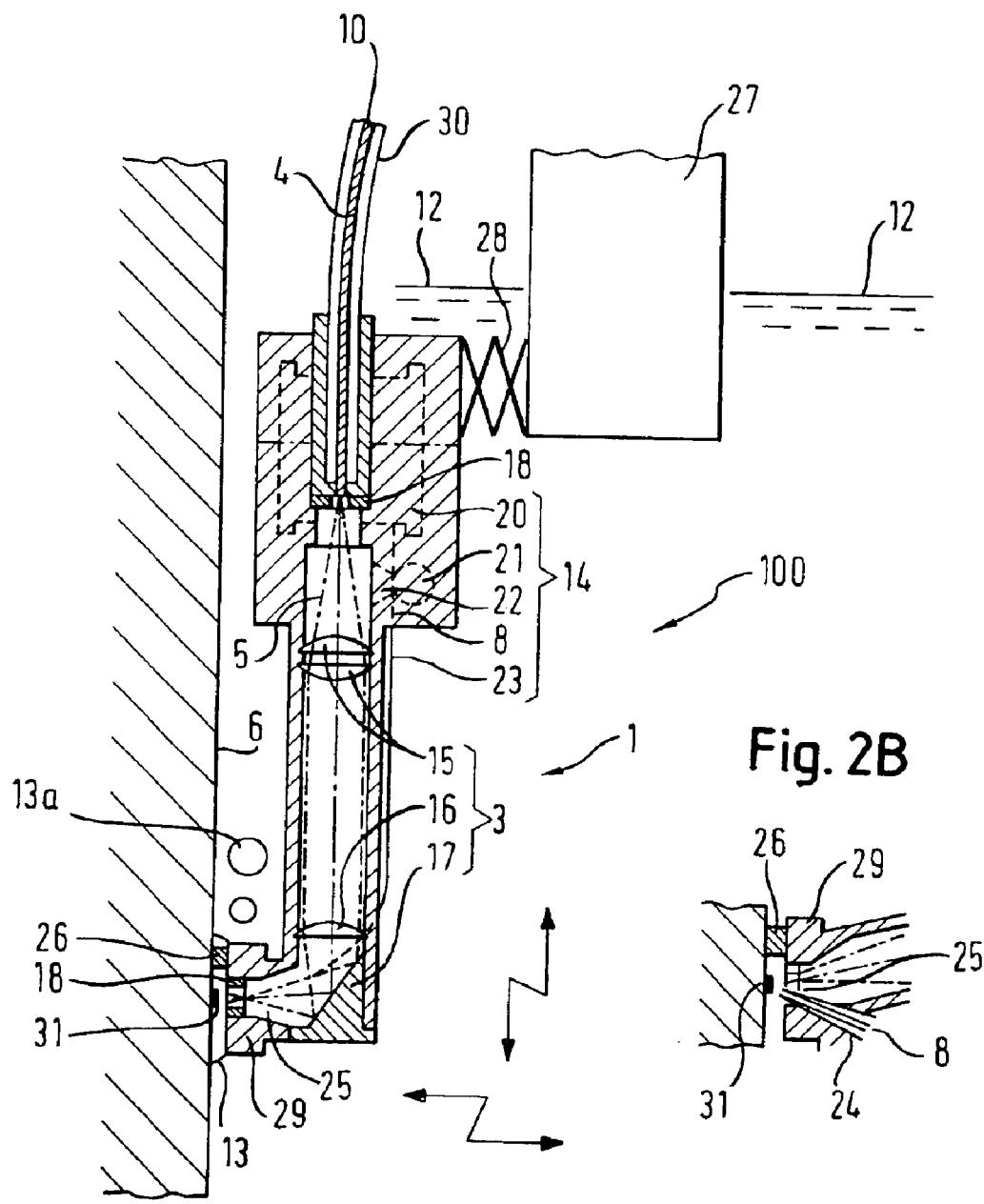
FIG. 2A is a sectional view showing an irradiation head and FIG. 2B is a sectional view showing the tip portion of the irradiation head according to a first embodiment of the present invention.

FIG. 2A is a sectional view showing an underwater laser processing apparatus according to a first embodiment of the present invention. The underwater laser processing apparatus 100 is operated below a water surface 12 and is equipped with an optical head 1. The optical head 1 includes an optical unit 3 having an optical fiber 4, a plurality of collimator lenses 15, and a condenser lens 16 in that order. A welding wire feeder 14 supplies a welding wire 8 through the optical head 1.

The optical unit 3 is arranged parallel to a laser beam 5 guided by the optical fiber 4 connected to a laser oscillator (not shown in FIG. 2A), and the collimator or condenser lens 16 condenses the parallel laser beam to a weld 31 on a work or workpiece 6 to be processed. A reflecting mirror 17 is secured in the bottom of the optical head 1 and reflects the condensed laser beam.

By use of the reflecting mirror 17, the laser beam 5 is irradiated to the workpiece 6 with its axis inclined at an angle of about 10 to 20 degrees. This avoids entry of a reflected laser beam into the laser oscillator through the optical head 1. Similarly, a bush 18 is disposed on the end portion of the optical fiber 4 or the end portion of the optical head 1. This can also avoid entrance of the reflected laser beam into the laser oscillator to prevent damage to the laser oscillator.

Figure 2B:
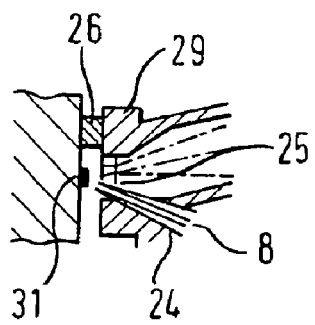

The welding wire feeder 14 for feeding the welding wire 8 includes a reel 20 that stores the welding wire 8, a motor 22 that supplies the welding wire 8 from the reel 20, and a feeder pipe 23 that guides the welding wire 8. As shown in detail in FIG. 2B, the welding wire feeder 14 also includes a wire tip 24 disposed at the end of the optical head 1. The wire tip 24 is preferably fixed to the feeder pipe 23 by brazing. The motor 22 drives rollers 21 to supply the welding wire 8 to the feeder pipe 23, and the welding wire 8 is sent to the weld 31 via the wire tip 24.

The structure above of the underwater laser processing apparatus 100 of the present invention is shown in FIG. 3A. A laser oscillator 35 such as a YAG (yttrium aluminum garnet) laser oscillator and a process machine 27 are disposed mainly upstream of the optical head 1. The laser oscillator 35 is disposed in atmosphere (air) together with a gas source 32 supplying gas to the optical head 1. The laser oscillator 35 and the optical head 1 is connected by the optical fiber 4 to guide the YAG laser beam. The optical fiber 4 has an outside guard tube 30, and a shield gas 10 from the gas source 32 is sent to the optical head 1 by using the outside guard tube 30. This structure makes it possible to omit separate tubes especially for the shield gas 10.

A process machine 27 has a rotor 37 supported by a beam 36 above the workpiece 6 having a cylindrical shape, a horizontal slider 38 connected to the axis of the rotor 37 to allow movement along radial direction of the workpiece 6, and a vertical slider 39 connected to the top of the horizontal slider 38 to allow movement along an axial direction of the workpiece 6. The optical head 1 is connected to the lower end of the vertical slider 39.

By using the above-described structure, the optical head 1 is roughly positioned near the weld 31. Suction pads 40 disposed on the lower end of the vertical slider 39 fix the vertical slider 39 to the workpiece 6, and the optical head 1 is positioned precisely by a folding arm 41. After the positioning, the optical head 1 is used to process (repairing, welding or the like) the workpiece 6 by driving a two-axial slider 42.

Further, as shown in FIG. 2A, the optical head 1 connects a gap adjuster such as a sliding member 26 on the side of a nozzle 29. The optical head 1 and the process machine 27 are connected with a spring 28. Even if the work 6 has an uneven surface, the optical head 1 can keep a certain gap between the nozzle 29 and the workpiece 6 by elasticity of the spring 28. The gap is controlled to keep underwater laser processing stable.

Some examples of the nozzle 29 of the present invention are shown in FIGS. 4A and 4B. In one embodiment, the nozzle 29 is connected to the end of the optical head 1, and is shaped like a disk. A hole 25 for supplying the gas and the welding wire is provided in the middle of the nozzle 29.

To use such a nozzle 29, the surface area of the nozzle 29 facing the workpiece 6 can be increased. This can maintain a larger amount of gas between the nozzle 29 and the workpiece 6, and a gas atmosphere 13 can be generated and maintained during the laser process as shown in FIG. 2A.

Note that more gas can be trapped as the gas atmosphere 13 when a subtracted span 33 between the nozzle 29 and the hole 25 is increased. According to our study, it is preferable to choose the span 33 to be more than 1.5 mm.

As shown in FIG. 4B, it is also possible to form circular grooves 34 on the surface of the nozzle 29 facing the workpiece 6. The section of the groove 34 may be rectangular, triangular, semicircular or the like. In the conventional method, supplying gas to the nozzle exhausts the gas as the bubbles and the same amount of water around the nozzle is enters to the optical head 1. However, the groove 34 acts as a resistance against water 12, even if a bubble 13a is generated, and the gas atmosphere 13 can be maintained.

Figures 5, 6:
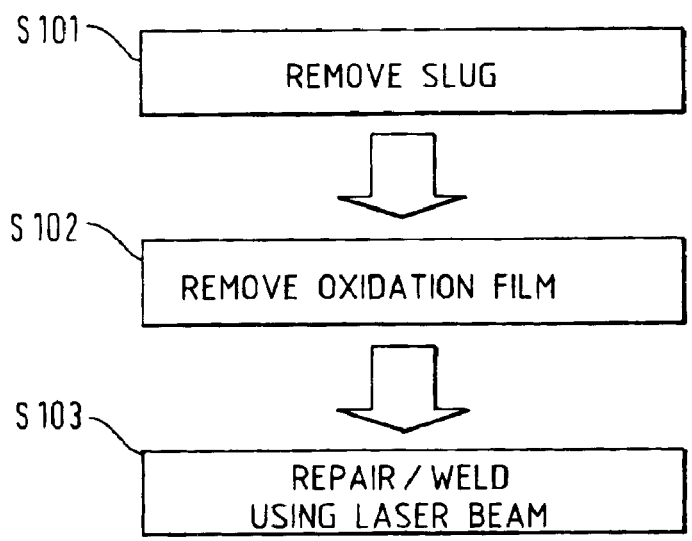
FIG. 5 is a chart showing a process condition according to the first embodiment of the present invention.
FIG. 6 is a flow chart showing a process method including the present invention.

An example of process condition on the underwater laser process is shown in FIG. 5. For example, when using a YAG laser oscillator, a wavelength of 1.06 µm, an output power of between 0.5 and 4.0 kW, a process speed of between 0.1 and 5.0 m/min, a welding wire diameter of between 0.4 and 1.0 mm, and a wire feeding speed of between 0.5 and 8.0 m/min can preferably be used to achieve stable underwater laser repair/weld processing.

In FIG. 6, a flow diagram of the underwater laser repair/weld process is shown. Assuming that the workpiece 6 is a nuclear reactor, the reactor may have slugs and oxidation films on its surface. Therefore, to achieve a stable underwater process, removing slugs and oxidation films beforehand is necessary. First, slugs are removed by using a wire brush, a grinder or the like (S101). Second, oxidation films are removed by using a laser beam or the like (S102). Then, cracks are repaired/welded by using a laser beam (S103). The removing processes S101 and S102 are executed underwater, as well as the process S103 of the present invention.

Regarding the repair/weld process, because the wire feeder 14 is connected to the optical head 1, the wire feeder 14 can smoothly supply the welding wire 8. Further, because the welding wire 8 is guided by the wire tip 24, it is possible to supply the welding wire 8 to the weld 31 directly without dampness. In addition, since the wire tip 24 is disposed inside a nozzle hole 25, the welding wire 8 can be dried by the shield gas 10 that is supplied to the weld 31.

According to the first embodiment of the present invention, it is possible to generate a stable gas atmosphere at a processing point on the workpiece, and thereby realizing an underwater laser process of better quality.

FIG. 7A is sectional view showing an irradiation head according to a second embodiment of the present invention. The basic feature of the optical head 1 of the underwater laser processing apparatus 200 of the second embodiment is similar to the first embodiment. Because the reflecting mirror 17 of the first embodiment is omitted, the optical head 1 of the second embodiment can repair/weld a horizontal surface of the work 6. Considering gravity, this posture of the optical head 1 is preferable to keep the gas atmosphere 13 stable. Furthermore, because a roller 26a is used as a gap adjuster, instead of the slider of the first embodiment, the optical head 1 can move along the surface of the work 6 with little friction.

Figure 8A:
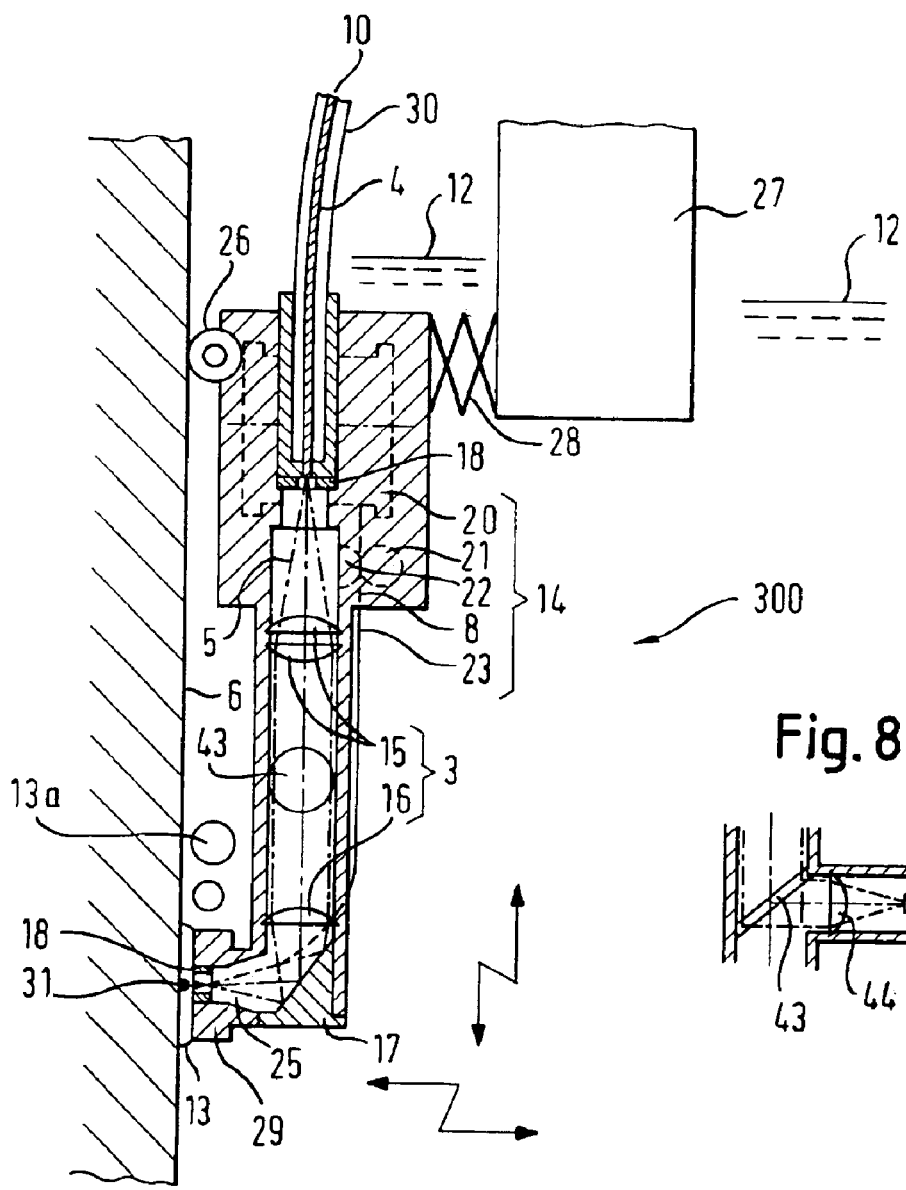
FIG. 8A is a sectional view of an irradiation head and FIG. 8B is a sectional view of an irradiation head around a dichroic mirror according to a third embodiment of the present invention.
Figure 8B:
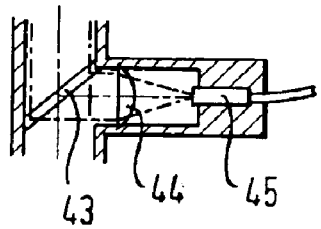

FIG. 8A is a sectional view of an irradiation head according to a third embodiment of the present invention. In the underwater laser process apparatus 300 of the third embodiment, a dichroic mirror 43 is disposed between the collimator lenses 15 and the condenser lens 16, and is inclined at an angle of 45 degrees to the light path. The dichroic mirror 43 allows transmission of the laser beam, but separates visible light by way of reflection. Further, another condenser lens 44 and a charge coupled device (CCD) camera 45 used as an image sensor, are disposed downstream of the reflected light path. Here, the CCD camera 45 can be radiation resistant. According to the third embodiment, the condition of the weld 31 before and during processing can be recognized by inputting the reflected visible light from the dichroic mirror 43 to the CCD camera 45. The recognition of the weld 31 before processing is valuable to improve precision of position of the weld 31.

The foregoing discussion discloses and describes merely a number of exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting, of the scope of the invention, which is set forth in the following claims. Thus, the present invention may be embodied in various ways within the scope of the spirit of the invention. The entire contents of Japanese Patent Application P2000-295818, filed on Sep. 28, 2000, are incorporated by reference herein.

What is claimed is:

1. An underwater laser processing method, comprising:

irradiating a condensed laser beam generated by a laser source to a certain point of an underwater workpiece;

supplying gas to the certain point from a nozzle having a gas exit, the nozzle having an area surrounding the gas exit that extends to the surface of the workpiece for keeping the supplied gas between the nozzle and the workpiece, wherein the nozzle is formed as a disk having a flat surface area extending in a circumferential direction thereof and having the gas exit at the center thereof, the nozzle having a circular groove extending in a circumferential direction thereof on the surface of the workpiece; and supplying a welding wire from within the nozzle to the certain point, wherein the nozzle has a circular groove on the surface of the nozzle facing the workpiece.

* * * * *